United States Patent
Fukuoka et al.

(10) Patent No.: US 7,532,864 B2
(45) Date of Patent: May 12, 2009

(54) NOISE POWER ESTIMATION METHOD AND NOISE POWER ESTIMATION DEVICE

(75) Inventors: Masaru Fukuoka, Kanazawa (JP); Atsushi Sumasu, Yokosuka (JP); Sadayuki Abeta, Chiyoda-ku (JP); Noriyuki Maeda, Chiyoda-ku (JP); Hiroyuki Atarashi, Chiyoda-ku (JP)

(73) Assignee: Panasonic Corporation, Osaka (JP)

( * ) Notice: Subject to any disclaimer, the term of this patent is extended or adjusted under 35 U.S.C. 154(b) by 488 days.

(21) Appl. No.: 10/524,213

(22) PCT Filed: Feb. 16, 2004

(86) PCT No.: PCT/JP2004/001633

§ 371 (c)(1),
(2), (4) Date: Jul. 18, 2005

(87) PCT Pub. No.: WO2004/073223

PCT Pub. Date: Aug. 26, 2004

(65) Prior Publication Data

US 2006/0154608 A1 Jul. 13, 2006

(30) Foreign Application Priority Data

Feb. 17, 2003 (JP) .............................. 2003-038935

(51) Int. Cl.
*H04B 17/00* (2006.01)

(52) U.S. Cl. ................ 455/67.13; 455/67.11; 455/63.1; 455/65; 455/226.1; 455/226.3; 455/296; 375/229; 375/232; 375/147; 375/150; 375/343; 375/346

(58) Field of Classification Search ............. 455/67.11, 455/67.13, 226.1–3, 295–296, 63.1, 65; 375/343–350, 375/147, 150–153, 229–232

See application file for complete search history.

(56) References Cited

U.S. PATENT DOCUMENTS 5,572,552 A * 11/1996 Dent et al. .................. 375/343

(Continued)

FOREIGN PATENT DOCUMENTS

JP 2003258766 9/2003

(Continued)

OTHER PUBLICATIONS

PCT International Search Report dated Jun. 8, 2004.

*Primary Examiner*—Tuan A Tran
(74) *Attorney, Agent, or Firm*—Dickinson Wright, PLLC

(57) ABSTRACT

A pilot extract section 14 extracts a pilot signal from received signal. An adder 21 in-phase adds a plurality of correlated values of pilot signals for respective subcarriers. Delay devices 201-1 to 201-6 temporarily maintain one in-phase added value. Multiplier 202-1 to 202-6 multiplies a predetermined coefficient to the in-phase added value that is output from the delay device. The predetermined coefficient reflects the result, which is obtained by correcting for multiple times the difference of channel variation in the different subcarriers that is generated when noise power per one subcarrier is calculated. Each of the multiplying results is added by an adder 24, and is squared by a square device 25. A cumulative adder 26 cumulative-adds the squared values for the whole subcarrier. A multiplier 203 averages by multiplying predetermined values to the cumulative-added values. Having such configuration, even if the correlation between adjacent subcarriers becomes lower by frequency selective fading, the accuracy for estimating noise power can be improved.

6 Claims, 10 Drawing Sheets

U.S. PATENT DOCUMENTS

| | | | |
|---|---|---|---|
| 6,542,483 B1 * | 4/2003 | Dinc et al. | 370/332 |
| 6,879,577 B2 * | 4/2005 | Lee | 370/342 |
| 7,010,017 B2 * | 3/2006 | Lin | 375/147 |
| 7,046,963 B2 * | 5/2006 | Luo et al. | 455/67.11 |
| 7,072,381 B2 * | 7/2006 | Atarashi et al. | 375/144 |
| 7,099,270 B2 * | 8/2006 | Yamaguchi | 370/208 |
| 2003/0123530 A1 | 7/2003 | Maeda et al. | |

FOREIGN PATENT DOCUMENTS

JP  2003348046  12/2003

\* cited by examiner

NOISE POWER ESTIMATION METHOD AND NOISE POWER ESTIMATION DEVICE

TECHNICAL FIELD

The present invention relates to a method for estimating noise power and a noise power estimation apparatus, and is preferable for being applied to, for example, radio receiver apparatus.

BACKGROUND ART

In multi carrier-code division multiple access (MC-CDMA), there is a method for spreading to a frequency domain. In this method, after the information data stream is spreaded with a given spreading code series, each chip is mapped to different subcarriers. FIG. 1 is a schematic diagram showing a packet configuration of the MC-CDMA conducting a frequency domain spreading. Here, a primary-pilot channel (P-PICH) is shown with oblique lines, a dedicated-pilot channel (D-PICH) with halftone dot meshing, and dedicated physical channel (DPCH) with white background. The P-PICH is a pilot for a cell searching and a synchronized tracking, and the D-PICH is a pilot employed for SIR estimation for adaptive radio parameter control, channel estimation of the DPCH and Doppler frequency estimation.

In these packets shown in this figure, one frame (54 symbols) is composed of two slots. In one frame, P-PICH, D-PICH and DPCH are time division-arranged. As can be seen from the figure, four symbols are arranged in one frame for the D-PICH.

Conventionally, in order to ideally conduct a control such as adaptive modulation or a resource allocation, it is necessary to appropriately measure the quality of received signal, and noise power maybe employed as a quality of received signal. The noise power includes a thermal noise generated inside a receiver and a noise generated by an interference of the other cell through the propagation path. The D-PICH having the above-described packet configuration is employed for the estimation of the noise power (referred to as "N+I$_{o\text{-}ther}$") per one frame. Conventional estimation for the noise power ("N+I$_{other}$") is described as follows.

FIG. 2 is a block diagram showing a configuration of a conventional receiving system. In this figure, radio processing section 11 receives signal transmitted from a communication partner through an antenna, and predetermined radio processing such as down conversion and AD conversion is conducted on the received signal, and radio processed signal is output to GI removal section 12. The GI removal section 12 eliminates guard interval of signal that is output from the radio processing section 11, and the processed signal is output to a FFT section 13. The FFT section 13 acquires signal, which is transmitted on each subcarrier by conducting fast Fourier transform for signal output by the GI removal section 12. The acquired signals at each of subcarriers are output to a pilot extract section 14.

Pilot extract section 14 extracts time multiplexed pilot channel (PICH) from a signal of each of subcarriers that is output from the FFT section 13, and the extracted PICH is output to a noise power estimation section 15. On the other hand, signal excluding PICH is output to P/S converter 16.

The noise power estimation section 15 estimates noise power on the basis of PICH that is output from the pilot extract section 14. Details of the noise power estimation section 15 will be described later.

P/S converter 16 conducts P/S conversion processing for signal excluding PICH that is output from the pilot extract section 14 and output P/S converted signal to a despreading section 17. The despreading section 17 conducts a despread processing by multiplying a predetermined spread code to the P/S converted signal and output despreaded signal to a demodulating section 18. The demodulating section 18 conducts demodulating processing for despreaded signal that is output from the despread section 17, and output them to a decoding section 19. The decoding section 19 conducts a decoding processing such as turbo decoding and the like to signal that is output from the demodulating section 18, and output them to an error detecting section 20. The error detecting section 20 conducts an error detection of signal that is output from the decoding section 19, and output data if error is not detected.

FIG. 3 is a block diagram showing an internal configuration of the noise power estimation section 15 in a conventional apparatus. Adder 21 calculates pilot symbol correlated/in-phase added value ($\xi i$) of a subcarrier i in time orientation using PICH that is output from the pilot extract section 14, and output the calculation results of each of subcarriers to a delay device 22-1 (shown as "D" in figure) and a multiplier 23-1.

The delay device 22-1 delays $\xi$ of respective subcarriers that are output from the adder 21 until next $\xi$ is input, and the obtained $\xi$ is output to a delay device 22-2 and a multiplier 23-2. These operations are similarly applied to delay devices 22-2 to 22-4, and these delay devices delays $\xi_{i-2}$ to $\xi_{i+1}$ that are output from the adder 21 (i is defined to be within a range of from 0 to 767) by one, respectively, to output $\xi$ to multipliers coupled to each of the delay devices. However, there is no output from the delay device 22-2 to the multiplier. In this case, it is assumed that 768 subcarriers are employed, and delay processing is conducted for 768 $\xi$s.

The multipliers 23-1 to 23-4 contains predetermined coefficients that are logically calculated beforehand, and respective predetermined coefficients are multiplied to $\xi$ that are respectively input, and is output to the adder 24. The adder 24 adds four $\xi$ input therein, and outputs to a square device 25. The square device 25 calculates squares of values that are output from the adder 24 to calculate the noise powers of respective subcarriers. A cumulative adder 26 performs cumulative-addition on noise powers of respective subcarriers that are output from the square device 25, and output the results of the cumulative-additions to a multiplier 27. Multiplier 27 multiplies predetermined coefficients to the added values that are output from the cumulative adder 26 to calculate "N+I$_{other}$".

FIG. 4 is a diagram, showing PICH with its relation between time and subcarrier. In this figure, the vertical axis indicates numbering of subcarriers (subcarrier i: i=0 to Nc−1), the horizontal axis indicates time, and PICH is shown as $r_{i,j}$. Here, Nc is number of the employed subcarriers. The signs $r_{i,j}$ is a correlation value of received signal of PICH symbol j of subcarrier i, and scramble code and pilot symbol pattern are removed therefrom. For example, PICH transmitted from subcarrier 1 are $r_{1,0}$, $r_{1,1}$, $r_{1,2}$, $r_{1,3}$.

In the next, an arithmetic operation conducted within the noise power estimation section 15 will be described using formulas. In the adder 21, pilot symbol correlated/in-phase added values in time orientation ($\xi$) is obtained for respective subcarriers by using $r_{i,j}$. More specifically, the values are obtained by the following formula:

[formula 1]
$$\xi_i = \frac{1}{4}\sum_{j=0}^{3} r_{i,j} \qquad (1)$$

Alternatively, $\xi_i$ can be represented by $\xi_i = h_i + n_i$, by using noise component $n_i$ and channel variation component $h_i$. $\xi_i$ calculated in the adder 21 is transmitted to delay devices 22-1 and multiplier 23-1 consecutively.

We will specifically find out "N+I$_{other}$" by focusing on subcarrier i as follows. Here, a case of using $\xi$ averaged for two adjacent subcarriers for calculating noise power per one subcarrier will be described:

[formula 2]
$$\varepsilon_{i-0.5} = \frac{1}{2}(h_{i-1} + n_{i-1}) + \frac{1}{2}(h_i + n_i) \qquad (2)$$

[formula 3]
$$\varepsilon_{i+0.5} = \frac{1}{2}(h_i + n_i) + \frac{1}{2}(h_{i+1} + n_{i+1}) \qquad (3)$$

Here, $\epsilon_{i-0.5}$ and $\epsilon_{i+0.5}$ are the averaged values of respective $\xi$ of subcarrier number i−1 and i and subcarrier number i and i+1. Assuming that the condition is free of noise and the correlation between adjacent subcarriers is 1, the value obtained by subtracting $\epsilon_{i+0.5}$ from $\epsilon_{i-0.5}$ becomes zero. Therefore it is considered that the values obtained as differences are noise component. The noise power for subcarrier i is found by squaring the noise component thus obtained. More specifically, it can be expressed by the following formula (4):

[formula 4]
$$\sigma_i = |\epsilon_{i-0.5} - \epsilon_{i+0.5}|^2 \qquad (4)$$

The following formula (5) can be derived from formula (2) and formula (3):

[formula 5]
$$\sigma_i = \left|\frac{1}{2}(h_{i-1} - h_{i+1}) + \frac{1}{2}(n_{i-1} - n_{i+1})\right|^2 \qquad (5)$$

In this case, correlations between adjacent subcarrier waves are not necessarily be 1 for subcarriers i−1 to i+1, and thus there may be a case that a difference in channel variation h is generated. In other words, since the value obtained by subtracting $h_{i+1}$ from $h_{i-1}$ is not zero, error is generated for σi that is wanted to be found. Therefore, a correction is done in order to diminish error generated by channel variation to obtain the following formula (6):

[formula 6]
$$\sigma_i' = \left|\frac{1}{2}(h_{i-1} - h_{i+1}) + \frac{1}{2}(n_{i-1} - n_{i+1}) - \frac{1}{2}(\hat{h}_{i-1} - \hat{h}_{i+1})\right|^2 \qquad (6)$$

Here, $\hat{h}_{i-1}$ is a value obtained by averaging $\xi$ for the plurality of subcarriers adjacent to subcarrier i−1, and can be obtained by the following formula (7):

[formula 7]
$$\hat{h}_{i-1} = \frac{1}{2}(\varepsilon_{i-1.5} + \varepsilon_{i-0.5})$$
$$= \frac{1}{2}\left\{\frac{1}{2}(h_{i-2} + n_{i-2}) + \frac{1}{2}(h_{i-1} + n_{i-1}) + \frac{1}{2}(h_{i-1} + n_{i-1}) + \frac{1}{2}(h_i + n_i)\right\}$$
$$= \frac{1}{4}(h_{i-2} + 2h_{i-1} + h_i + n_{i-2} + 2n_{i-1} + n_i) \qquad (7)$$

On the other hand, $\hat{h}_{i+1}$ is obtained by the following formula (8):

[formula 8]
$$\hat{h}_{i+1} = \frac{1}{2}(\varepsilon_{i+0.5} + \varepsilon_{i+1.5})$$
$$= \frac{1}{4}(h_i + 2h_{i+1} + h_{i+2} + n_i + 2n_{i+1} + n_{i+2}) \qquad (8)$$

In this way, h can more precisely be found by conducting the averaging operation using $\xi$ across a plurality of subcarriers, thereby diminishing an error of σi. Formula (7) and formula (8) are substituted into formula (6) to obtain formula (9) shown below:

[formula 9]
$$\sigma_i' = \left(\frac{1}{8}\right)^2$$
$$|-(h_{i-2} - h_i) + 2(h_{i-1} - h_{i+1}) - (h_i - h_{i+2}) - n_{i-2} + 2n_{i-1} - 2n_{i+1} + n_{i+2}|^2 \qquad (9)$$

Here, assuming that differences of respective channel variation components are equal, i.e., $h_{i-1} - h_{i+1} = h_{i-2} - h_i = h_i - h_{i+2} = \Delta$, the relationship of the following formula (10) is satisfied:

[formula 10]
$$2\Delta = 2(h_{i-1} - h_{i+1}) = (h_{i-2} - h_i) + (h_i - h_{i+2}) \qquad (10)$$

Formula (11) is provided by conducting an approximating calculation of formula (9) using formula (10):

[formula 11]
$$\sigma_i' = \left(\frac{1}{8}\right)^2 |-n_{i-2} + 2n_{i-1} - 2n_{i+1} + n_{i+2}|^2 \qquad (11)$$

Formula (11) presents an arithmetic operation conducted in the square device 25, and, in practice, calculation is carried out by replacing n with $\xi$.

[formula 12]
$$\sigma_i' = \left(\frac{1}{8}\right)^2 |-\xi_{i-2} + 2\xi_{i-1} - 2\xi_{i+1} + \xi_{i+2}|^2 \qquad (12)$$

In this formula, coefficients of respective $\xi$ are the coefficients that are set by multipliers 23-1 to 23-4, respectively. In other words, a part of the calculation using formula (12) is conducted in these multipliers. The results by the calculation within the square device 25 is output to the cumulative adder 26. Thus, provided that $n_{i-2}$ to $n_{i+2}$ satisfy probability distribution of Gaussian distribution in formula (11) and average power is presented as $(na)^2$, it can be expressed by formula (13):

[formula 13]

$$\sigma'_i = \left(\frac{1}{8}\right)^2 \cdot 9(n_a)^2 \qquad (13)$$

Assuming that $\alpha=(\frac{1}{8})^2$ (9), the noise power ("N+$I_{other}$") can be presented as:

[formula 14]

$$N + I_{other} = \frac{4}{\alpha} \cdot (\sigma''_2 + \sigma''_3 + \sigma''_4 \cdots + \sigma''_{N_c-3})/N_c - 4 \qquad (14)$$

In this case, cumulative-adding operation for σ' that is output from the square device 25 is conducted in the cumulative adder 26, and 4/(($N_c$-4)×α) are multiplied thereto in the multiplier 27, thereby providing an estimation of "N+$I_{other}$". Here, the reason of multiplying 4 thereto is to reflect the value into noise power per one frame ("N+$I_{other}$"), as ξ is obtained by conducting the averaging operation using four pilot symbols. In addition, the reason of dividing by ($N_c$-4) is that number of cumulative-added σ' is given by ($N_c$-4), and thus conducting the average operation is intended.

Estimations of noise power has conventionally been carried out by the method stated above.

However, in the above-described conventional process for estimating noise power, there is a problem, in which noise power cannot be precisely estimated when the channel variations in respective subcarriers are large by the influence of frequency selectivity fading or the like.

DISCLOSURE OF INVENTION

An object of the present invention is to provide a method for estimating noise power and a noise power estimation apparatus, which provide improvement in the estimation accuracy of the noise power, even if the correlation between adjacent subcarriers is low due to the frequency selective fading.

The above-described object is achieved by repeatedly correcting differences in the channel variations in different subcarriers for multiple times when noise power per one frame ("N+$I_{other}$") is estimated.

BEST MODE FOR CARRYING OUT THE INVENTION

Embodiments of the present invention will be described in reference with the annexed figures as follows.

First Embodiment

Figure 3:
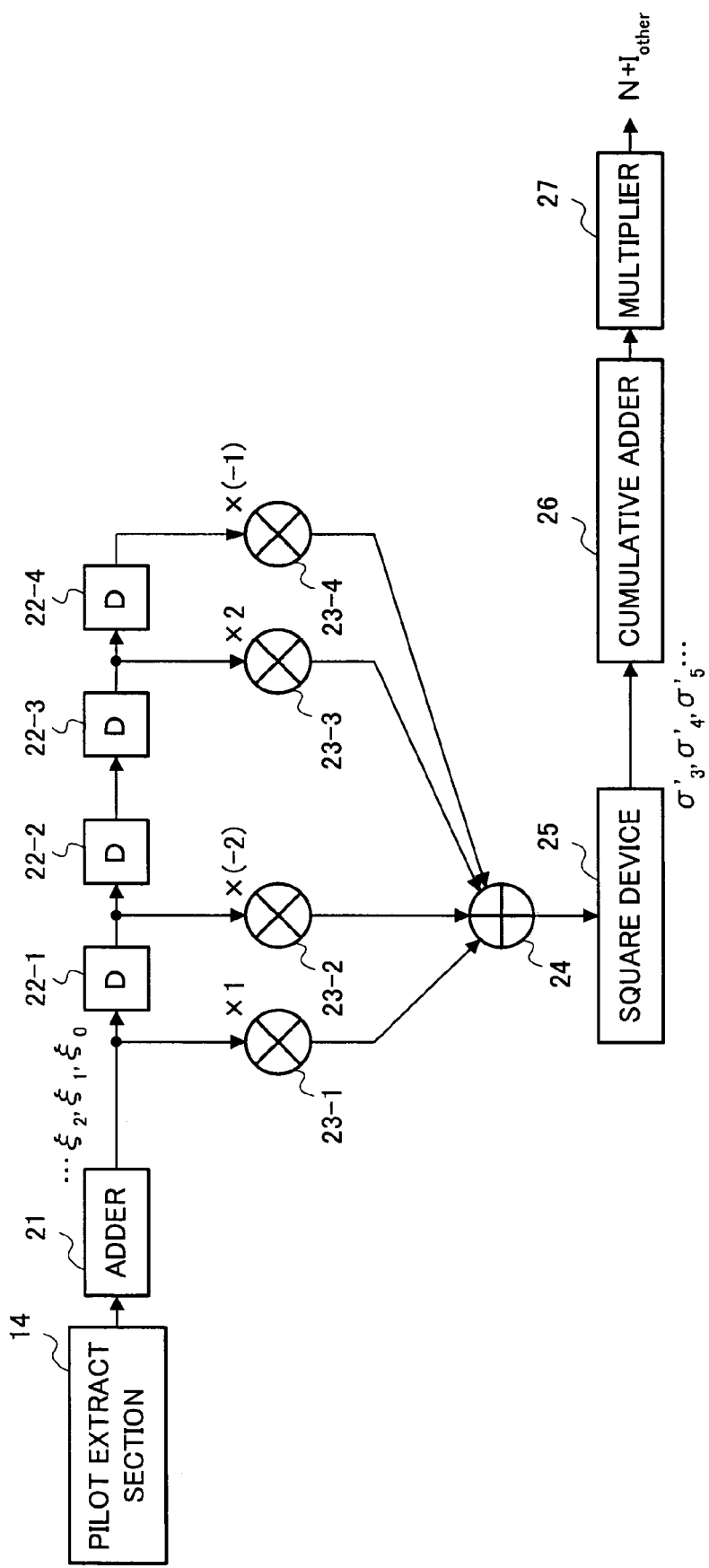
FIG. 3 is a block diagram showing an internal configuration of a conventional noise power estimation section.
Figure 4:
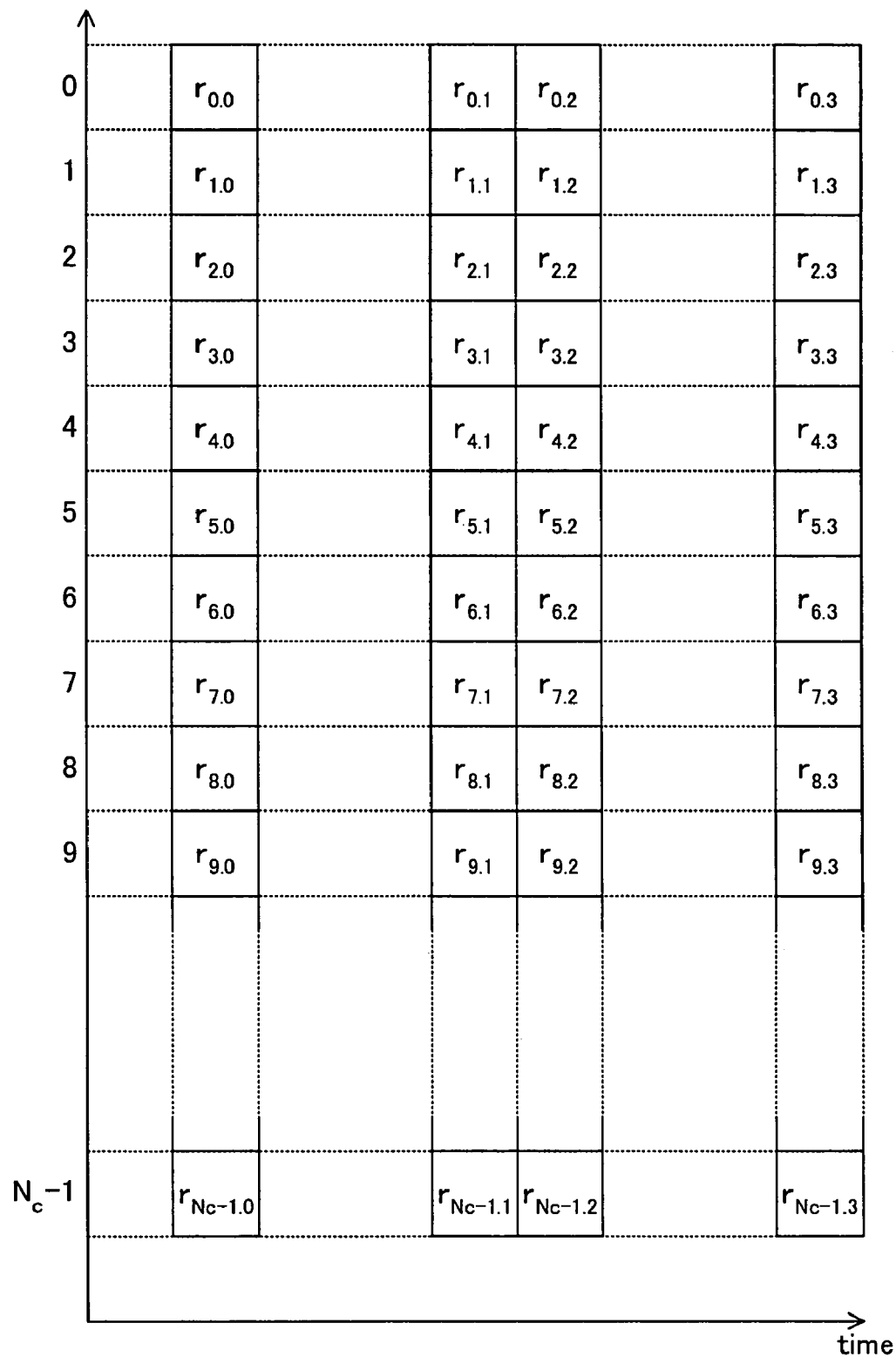
FIG. 4 is a diagram showing PICH with its relation between time and subcarrier.
Figure 5:
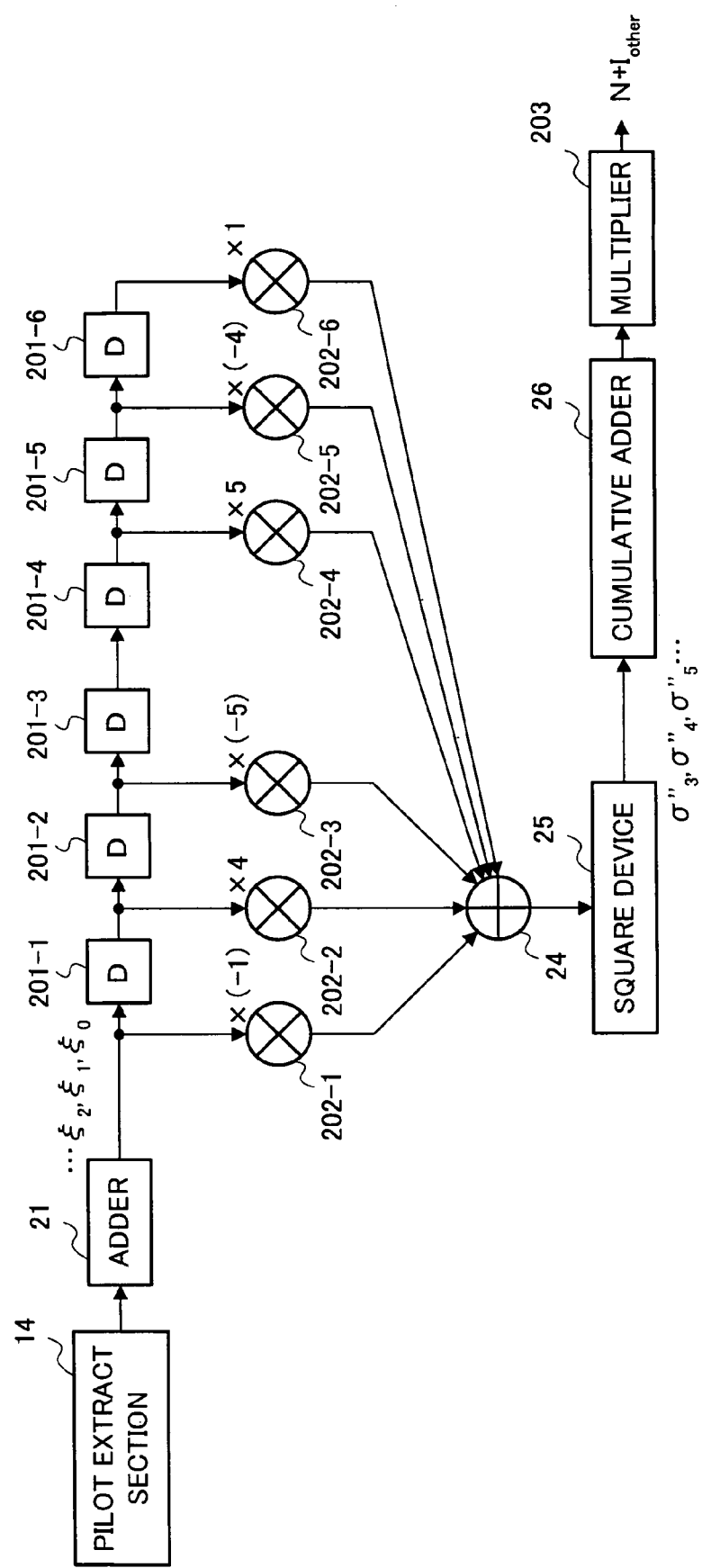
FIG. 5 is a block diagram showing an internal configuration of a noise power estimation section according to the embodiment 1 of the present invention.

FIG. 5 is a block diagram, showing an internal configuration of a noise power estimation section according to the first embodiment of the present invention. However, in this figure, same numeral number as in FIG. 3 is assigned to an element that is commonly appeared in FIG. 3, and the detailed explanation thereof is omitted. The point that FIG. 5 is different from FIG. 3, is that the number of the delay devices and the multipliers are respectively increased, and coefficients for multipliers 202-1 to 202-6 and a multiplier 203 are changed.

An adder 21 calculates pilot symbol correlated/in-phase addition value ($\xi_i$) in time orientation of subcarrier i using PICH that is output from a pilot extract section 14, and the calculated results for respective subcarriers are output to a delay device (indicated by "D" in the figure) 201-1 and a multiplier 202-1.

Delay devices 201-1 to 201-6 delays $\xi_{i-3}$ to $\xi_{i+2}$ (i=0 to 767) that are output from the adder 21 by one, respectively, and the delayed ξ is output to the multipliers that are respectively coupled to delay devices. However, there is no output from the delay device 201-3 to the multiplier.

Predetermined coefficients are set in advance, and the multipliers 202-1 to 202-6 multiply predetermined coefficients to ξ that are respectively input, and the multiplied values are output to the adder 24.

The multiplier 203 multiplies 4/(($N_c$-6)α) to values that are output from a cumulative adder 26 to calculate "N+$I_{other}$". Here, Nc is the number of the employed subcarriers, and α is a constant.

Next, an arithmetic operation conducted in a noise power estimation section stated above will be described using formula. However, since the processes of formula (1) to (9) are same as stated above, description will be made for operations after formula (9). In formula (9), a correction same as formula (6) is further introduced in order to diminish an error caused by channel variation component h. This is because, when a drift between the subcarriers is occurred due to frequency selective fading, correlation of the adjacent subcarriers is decreased to increase values obtained by subtracting the channel variation components generated between subcarriers therefrom, and thus the purpose for the correction is to estimate noise power ("N+$I_{other}$") with higher accuracy. The introduction of the correction into formula (9) provides a formula (15) shown below:

[formula 15]

$$\sigma_i'' = \left(\frac{1}{8}\right)^2 |\{-(h_{i-2} - h_i) + 2(h_{i-1} - h_{i+1}) - (h_i - h_{i+2})\} - \{-(\hat{h}_{i-2} - \hat{h}_i) + 2(\hat{h}_{i-1} - \hat{h}_{i+1}) - (\hat{h}_i - \hat{h}_{i+2})\} - n_{i-2} + 2n_{i-1} - 2n_{i+1} + n_{i+2}|^2 \quad (15)$$

Expand formula (15) to obtain formula (16):

[formula 16]

$$\sigma_i'' = \left(\frac{1}{8}\right)^2 \left(\frac{1}{4}\right)^2 |(h_{i-3} - h_{i-1}) - 4(h_{i-2} - h_i) + 6(h_{i-1} - h_{i+1}) - 4(h_i - h_{i+2}) + (h_{i+1} - h_{i+3}) + n_{i-3} - 4n_{i-2} + 5n_{i-1} - 5n_{i+1} + 4n_{i+2} - n_{i+3}|^2 \quad (16)$$

Here, assuming that differences of respective channel variation components are equal, i.e., $h_{i-1} - h_{i+1} = h_{i-3} - h_{i-1} = h_{i-2} - h_i = h_i - h_{i+2} = h_{i+1} - h_{i+3} = \Delta$, the relationship of the following formula (17) is satisfied:

[formula 17]

$$6\Delta = 6(h_{i-1} - h_{i+1}) = -(h_{i-3} - h_{i-1}) + 4(h_{i-2} - h_i) + 4(h_i - h_{i+2}) - (h_{i+1} - h_{i+3}) \quad (17)$$

Approximating formula (16) by employing formula (17) provides the following formula (18):

[formula 18]

$$\sigma_i'' = \left(\frac{1}{32}\right)^2 |n_{i-3} - 4n_{i-2} + 5n_{i-1} - 5n_{i+1} + 4n_{i+2} - n_{i+3}|^2 \quad (18)$$

Actually, the calculation of this formula (18) is carried out by replacing n with $\xi$.

[formula 19]

$$\sigma_i'' = \left(\frac{1}{32}\right)^2 |\xi_{i-3} - 4\xi_{i-2} + 5\xi_{i-1} - 5\xi_{i+1} + 4\xi_{i+2} - \xi_{i+3}|^2 \quad (19)$$

Coefficients set for multipliers 202-1 to 202-6 are same as coefficients of respective $\xi$ presented by formula (19), and values of the coefficients reflect the twice-corrections. Further, the adding operation for $\xi$ is conducted in the adder 24, and the added value is squared in a square device 25. Here, provided that $n_{i-3}$ to $n_{i+3}$ satisfy probability distribution of Gaussian distribution in formula (18) and the average power is presented as $(na)^2$, it can be expressed by formula (20):

[formula 20]

$$\sigma_i'' = \left(\frac{1}{32}\right)^2 \cdot 84(n_a)^2 \quad (20)$$

Assuming $\alpha = (1/32)^2$ (84), noise power ("N+$I_{other}$") is presented as:

[formula 21]

$$N + I_{other} = \frac{4}{\alpha} \cdot (\sigma_3'' + \sigma_4'' + \sigma_5'' \cdots + \sigma_{N_c-4}'')/N_c - 6 \quad (21)$$

In the cumulative adder 26, cumulative-adding operation is conducted for σ" that is output from the square device 25, and $4/((N_c-6)\alpha)$ are multiplied thereto in the multiplier 203. ($N_c-6$) is number of the cumulative-added σ".

As such, according to the present embodiment, errors generated by the channel variations can be diminished by introducing corrections twice during the process for estimating noise power, and thus the estimation accuracy of the noise power can be achieved, even if the correlations between adjacent subcarriers are decreased due to the frequency selective fading.

Second Embodiment

While the first embodiment illustrates the case of using $\xi$ that are obtained by averaging $\xi$ of adjacent two subcarriers when noise power per one subcarrier is calculated, the second embodiment will illustrate a case of using $\xi$ that are obtained by averaging $\xi$ of adjacent four subcarriers.

Figure 1:
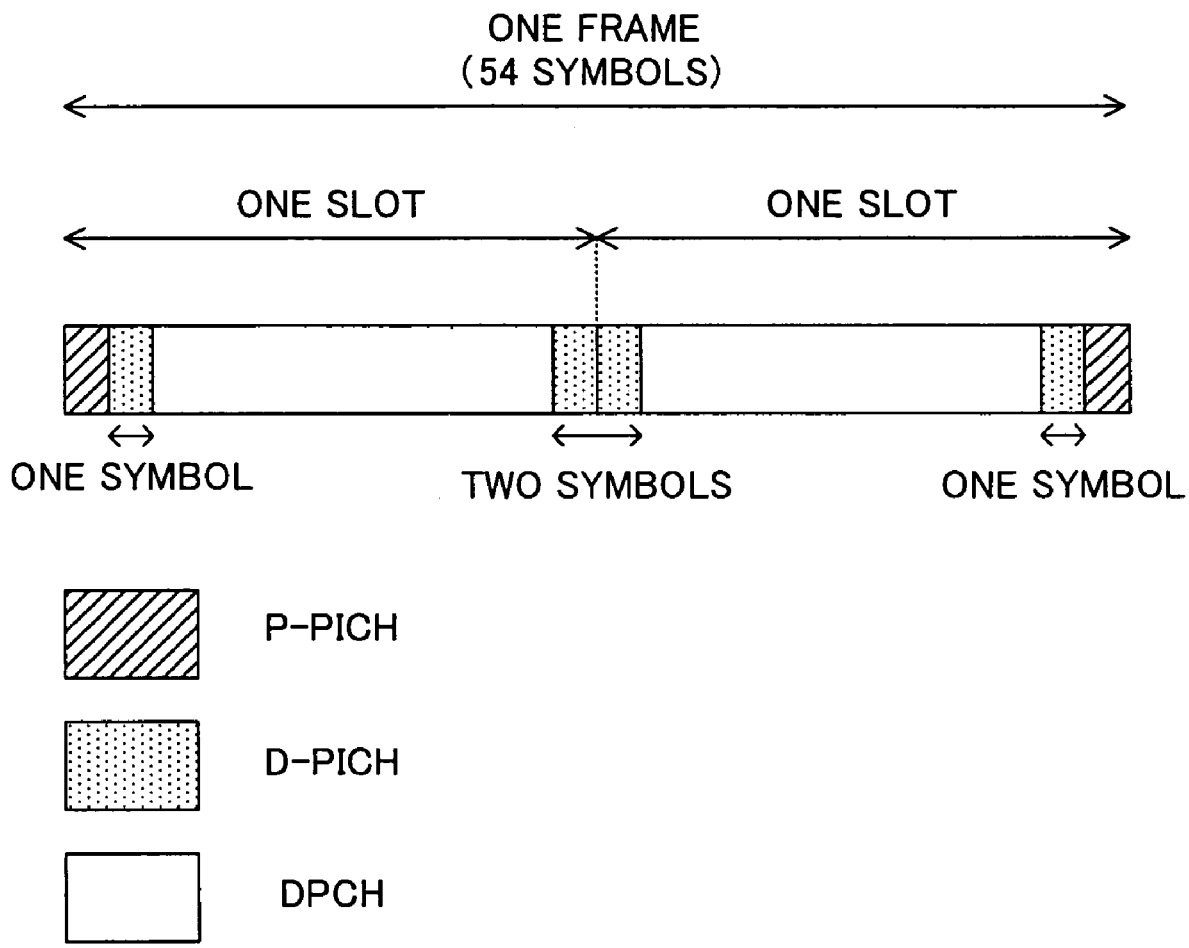
FIG. 1 is a schematic diagram of packet configuration of MC-CDMA.
Figure 2:
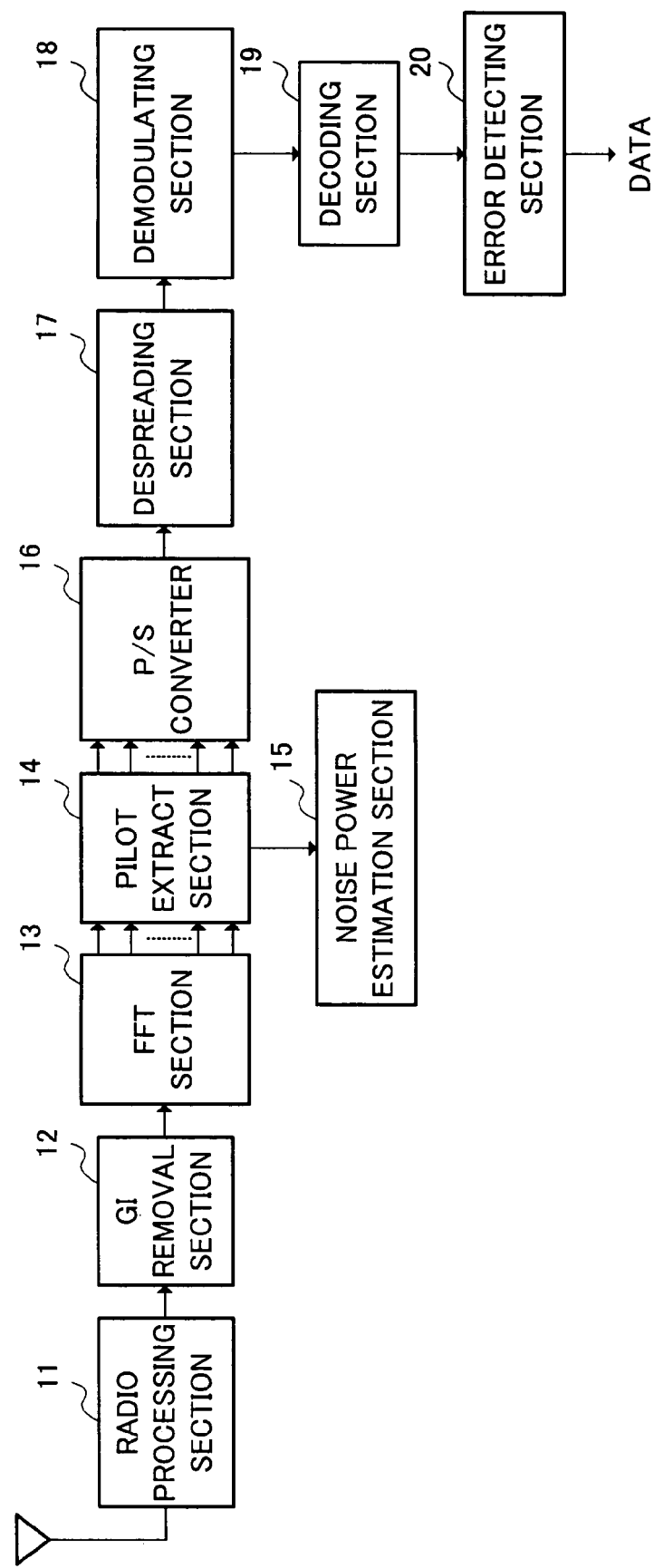
FIG. 2 is a block diagram showing a configuration of a conventional receiving system.
Figure 6:
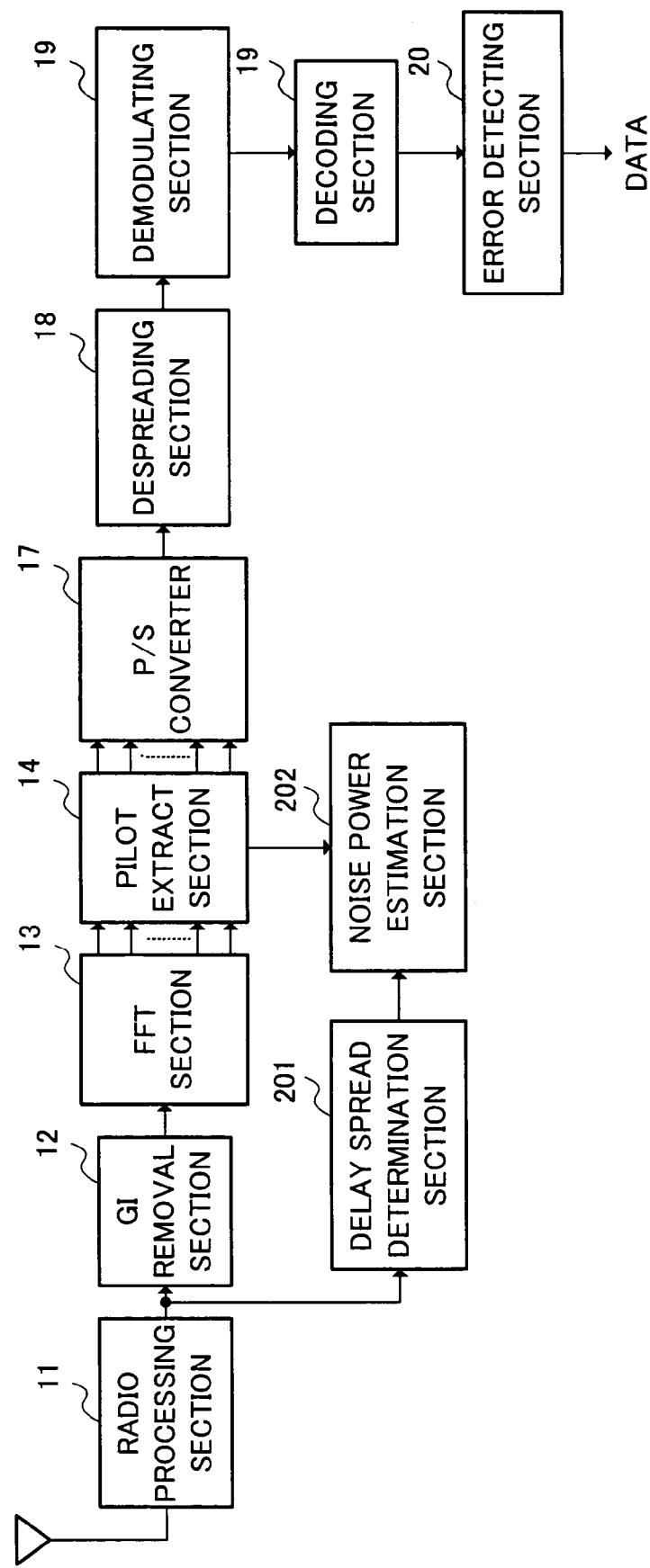
FIG. 6 is a block diagram showing a configuration of receiving system according to the embodiment 2 of the present invention.

FIG. 6 is a block diagram showing configuration of receiving system according to the second embodiment of the present invention. However, same numeral number as in FIG. 2 is assigned to an element that is commonly appeared in FIG. 2, and the detailed explanation thereof is omitted. A delay spread determination section 201 generates a delay profile on the basis of signal (received signal) that is output from a radio processing section 11 to measure a level of a spreading of multipath (Delay Spread).

The measurement results represent conditions of frequency selective fading, and levels of the correlations of the adjacent subcarriers can be judged by using thereof.

More specifically, the delay spread determination section 201 determines levels of the correlations of the adjacent subcarriers based on the measurement results, and output the evaluation results to the noise power estimation section 202.

The noise power estimation section 202 changes number of $\xi$ employed for the averaging operation, based on the evaluation results by the delay spread determination section 201. In other words, when the correlations between the subcarriers are high, the accuracy for the estimation of the noise power is improved by increasing number of $\xi$ employed for the averaging operation. On the other hand, when the correlations between subcarriers are low, an increase of the error caused by the differences of the channel variations can be prevented by reducing number of $\xi$ employed for the averaging operation. In the second embodiment, as compared with the first embodiment, the correlations between subcarriers are set to be higher, and number of $\xi$ employed for the averaging operation is increased to 4.

Figure 7:
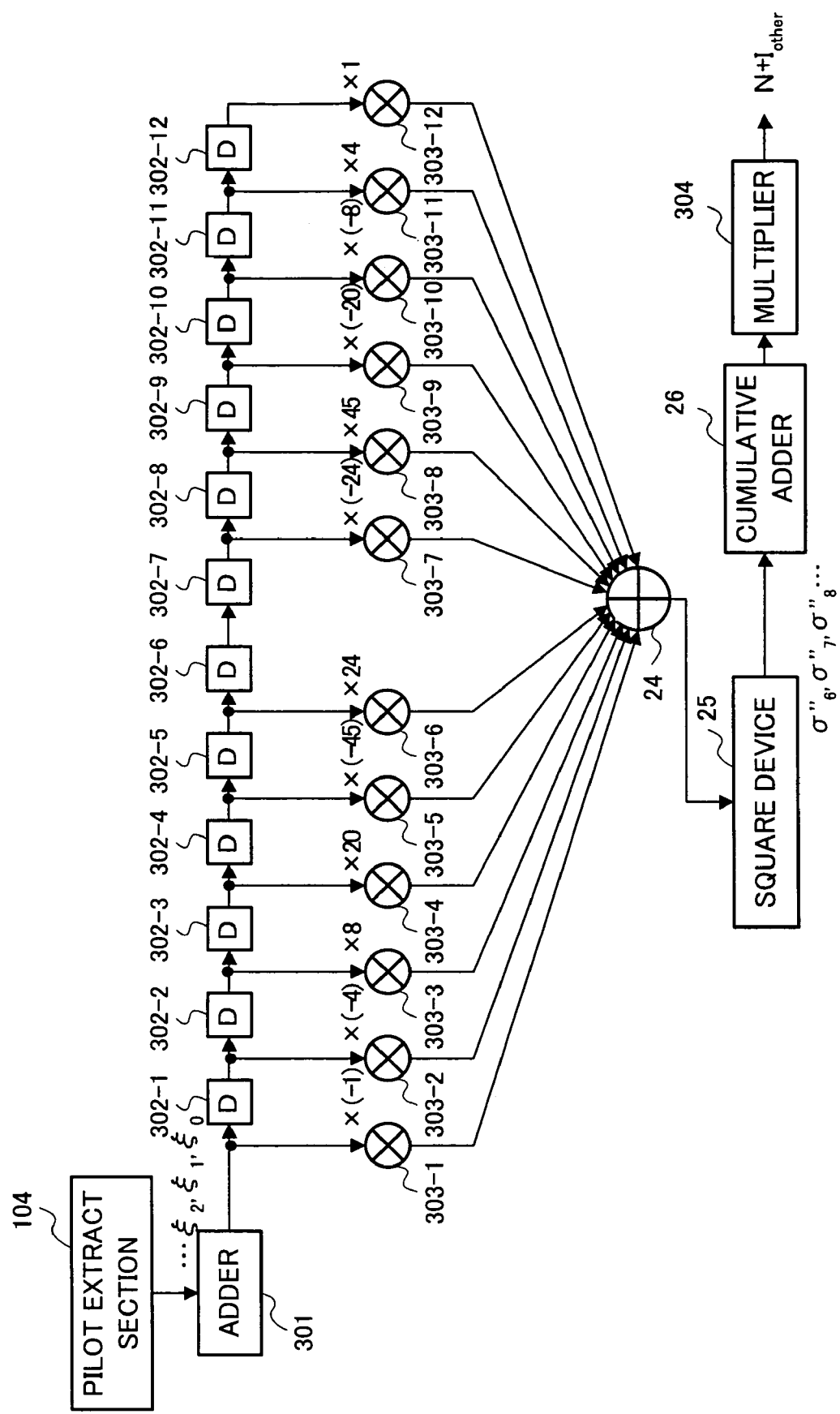
FIG. 7 is a block diagram showing an internal configuration of a noise power estimation section according to the embodiment 2 of the present invention.

FIG. 7 is a block diagram showing an internal configuration of the noise power estimation section 202 according to the second embodiment of the present invention. In this figure, same numeral number as in FIG. 5 is assigned to an element that is commonly appeared in FIG. 5, and the detailed explanation thereof is omitted. The point that FIG. 7 is different from FIG. 5, is that the adder 21 is replaced by an adder 301, number of the delay devices and the multipliers are respectively increased, and coefficients for multipliers 303-1 to 303-12 and a multiplier 304 are changed.

Arithmetic operations provided by the noise power estimation section 202 shown in FIG. 7 will be described using formula. Here, specific arithmetic operations will be described focusing on a subcarrier i:

[formula 22]

$$\varepsilon_{i-0.5} = \frac{1}{4}(h_{i-2} + n_{i-2}) + \frac{1}{4}(h_{i-1} + n_{i-1}) + \frac{1}{4}(h_i + n_i) + \frac{1}{4}(h_{i+1} + n_{i+1}) \quad (22)$$

[formula 23]

$$\varepsilon_{i+0.5} = \frac{1}{4}(h_{i-1} + n_{i-1}) + \frac{1}{4}(h_i + n_i) + \frac{1}{4}(h_{i+1} + n_{i+1}) + \frac{1}{4}(h_{i+2} + n_{i+2}) \quad (23)$$

Similarly as in the first embodiment, a difference value obtained by subtracting $\varepsilon_{i+0.5}$ from $\varepsilon_{i-0.5}$ is squared to obtain noise power for the subcarrier i.

[formula 24]

$$\sigma_i = |\varepsilon_{i-0.5} - \varepsilon_{i+0.5}|^2 \quad (24)$$

Formula (22) and formula (23) are substituted into formula (24) and the resultant formula is further simplified to obtain the following formula (25):

[formula 25]

$$\sigma_i = \left|\frac{1}{4}(h_{i-2} - h_{i+2}) + \frac{1}{4}(n_{i-2} - n_{i+2})\right|^2 \quad (25)$$

Here, a correction is added to formula (25) in order to diminish error generated by channel variation:

[formula 26]

$$\sigma_i' = \left|\frac{1}{4}(h_{i-2} - h_{i+2}) + \frac{1}{4}(n_{i-2} - n_{i+2}) - \frac{1}{4}(\hat{h}_{i-2} - \hat{h}_{i+2})\right|^2 \quad (26)$$

$\hat{h}_{i-2}$ and $\hat{h}_{i+2}$ are presented by the following formula (27) and formula (28), respectively:

[formula 27]

$$\hat{h}_{i-2} = \frac{1}{2}(\varepsilon_{i-2.5} + \varepsilon_{i+1.5}) = \quad (27)$$

$$\frac{1}{2}\left\{\frac{1}{4}(h_{i-4} + n_{i-4}) + \frac{1}{4}(h_{i-3} + n_{i-3}) + \frac{1}{4}(h_{i-2} + n_{i-2}) + \right.$$

$$\frac{1}{4}(h_{i-1} + n_{i-1}) + \frac{1}{4}(h_{i-3} + n_{i+3}) +$$

$$\left.\frac{1}{4}(h_{i-2} + n_{i-2}) + \frac{1}{4}(h_{i-1} + n_{i+1}) + \frac{1}{4}(h_i + n_i)\right\} =$$

$$\frac{1}{8}(h_{i-4} + 2h_{i-3} + 2h_{i-2} + 2h_{i-1} + h_i + n_{i-4} +$$

$$2n_{i-3} + 2n_{i-2} + 2n_{i-1} + n_i)$$

[formula 28]

$$\hat{h}_{i+2} = \quad (28)$$

$$\frac{1}{2}(\varepsilon_{i+1.5} + \varepsilon_{i+2.5}) = \frac{1}{8}(h_i + 2h_{i+1} + 2h_{i+2} + 2h_{i+3} + h_{i+4} + n_i + 2n_{i+1} +$$

$$2n_{i+2} + 2n_{i+3} + n_{i+4})$$

Formula (27) and formula (28) are substituted into formula (26) to obtain formula (29):

[formula 29]

$$\sigma_i' = \left(\frac{1}{32}\right)^2 |\{-(h_{i-4} - h_i) - 2(h_{i-3} - h_{i+1}) + 6(h_{i-2} - h_{i+2}) - \quad (29)$$

$$2(h_{i-1} - h_{i+3}) - (h_i - h_{i+4})\} + \{-n_{i-4} - 2n_{i-3} +$$

$$6n_{i-2} - 2n_{i-1} + 2n_{i+1} - 6n_{i+2} + 2n_{i+3} + n_1\}|^2$$

A correction is further introduced to formula (29), for the purpose of reducing an influence thereto by the channel variation components, in consideration of frequency selective fading.

[formula 30]

$$\sigma_i'' = \left(\frac{1}{32}\right)^2 \quad (30)$$

$$|\{-(h_{i-4} - h_i) - 2(h_{i-3} - h_{i+1}) + 6(h_{i-2} - h_{i+2}) - 2(h_{i-1} - h_{i+3}) -$$

$$(h_i - h_{i+4})\} - \{-(\hat{h}_{i-4} - \hat{h}_i) - 2(\hat{h}_{i-3} - \hat{h}_{i+1}) +$$

$$6(\hat{h}_{i-2} - \hat{h}_{i+2}) - 2(\hat{h}_{i-1} - \hat{h}_{i+3}) - (\hat{h}_i - \hat{h}_{i+4})\} +$$

$$\{-n_{i-4} - 2n_{i-3} + 6n_{i-2} - 2n_{i-1} + 2n_{i+1} - 6n_{i+2} + 2n_{i+3} + n_{i+4}\}|$$

Expand formula (30) to obtain the following formula (31):

[formula 31]

$$\sigma_i'' = \left(\frac{1}{32}\right)^2 \left(\frac{1}{8}\right)^2 |\{h_{i-6} - h_{i-2}) + 4(h_{i-5} - h_{i-1}) - 8(h_{i-4} - h_i) - \quad (31)$$

$$20(h_{i-3} - h_{i+1}) + 46(h_{i-2} - h_{i+2}) - 20(h_{i-1} - h_{i+3}) - 8(h_i - h_{i+4}) +$$

$$4(h_{i+1} - h_{i+5}) + (h_{i+2} - h_{i+6})\} + \{n_{i-6} + 4n_{i-5} - 8n_{i-4} - 20n_{i-3} +$$

$$45n_{i-2} - 24n_{i-1} + 24n_{i+1} - 45n_{i+2} + 20n_{i+3} + 8n_{i+4} - 4n_{i+5} - n_{i+6}\}|^2$$

Here, assuming that differences in respective channel variation components are equal, the following formula (32) is obtained:

[formula 32]

$$46\Delta = 46(h_{i-2} - h_{i+2}) = -(h_{i-6} - h_{i-2}) - 4(h_{i-5} - h_{i-1}) + 8(h_{i-4} - h_i) + 20(h_{i-3} - h_{i+1}) + 20(h_{i-1} - h_{i+3}) + 8(h_i - h_{i+4}) - 4(h_{i+1} - h_{i+5}) - (h_{i+2} - h_{i+6}) \quad (32)$$

Approximate formula (31) by employing formula (32) to obtain the following formula (33):

[formula 33]

$$\sigma_i'' = \left(\frac{1}{32}\right)^2\left(\frac{1}{8}\right)^2 |n_{i-6} + 4n_{i-5} - 8n_{i-4} - 20n_{i-3} + 45n_{i-2} - 24n_{i-1} + \\ 24n_{i+1} - 45n_{i+2} + 20n_{i+3} + 8n_{i+4} - 4n_{i+5} - n_{i+6}|^2 \quad (33)$$

Actually, the calculation of this formula (33) is carried out by replacing n with ξ. Calculating operation for obtaining square thereof is conducted in the square device 25:

[formula 34]

$$\sigma_i'' = \left(\frac{1}{256}\right)^2 |\xi_{i-6} + 4\xi_{i-5} - 8\xi_{i-4} - 20\xi_{i-3} + 45\xi_{i-2} - 24\xi_{i-1} + \\ 24\xi_{i+1} - 45\xi_{i+2} + 20\xi_{i+3} + \xi_{i+4} - 4\xi_{i+5} - \xi_{i+6}|^2 \quad (34)$$

Coefficients set for multipliers 303-1 to 303-12 are same as coefficients of respective ξ presented by formula (34), and values of the coefficients reflect the twice corrections. Further, adding operation for ξ is conducted by the adder 24, and the added values are squared in the square device 25.

Here, provided that ni−6 to ni+6 satisfy probability distribution of Gaussian distribution in formula (33) and average power is presented as $(na)^2$, it can be expressed by formula (35):

[formula 35]

$$\sigma_i'' = \left(\frac{1}{256}\right)^2 \cdot 6164 n_a^2 \quad (35)$$

Assuming $\alpha=(1/256)^2 (6164)$, noise power ("N+$I_{other}$") is presented as:

[formula 36]

$$N = I_{other} = \frac{4}{\alpha} \cdot (\sigma_6'' + \sigma_7'' + \sigma_8'' \cdots + \sigma_{N_c-7}'')/N_c - 12 \quad (36)$$

In the cumulative adder 26, cumulative-adding operation is conducted for σ″ that is output from the square device 25, and $4/((N_c-8)\alpha)$ are multiplied thereto in the multiplier 304. ($N_c-8$) is number of the cumulative-added σ″.

As such, according to the present embodiment, errors generated by the channel variations can be diminished by introducing corrections twice during the process for estimating noise power, when ξ of adjacent four subcarriers are averaged in the calculation for obtaining noise power per one subcarrier, and thus the estimation accuracy of the noise power can be achieved, even if the correlation between adjacent subcarriers is decreased due to the frequency selective fading.

Third Embodiment

While the first embodiment illustrates the case of twice conducting the correcting operations during the process for estimating noise power, the third embodiment will illustrate a case of conducting the correcting operations for three times during the process for estimating noise power.

Figure 8:
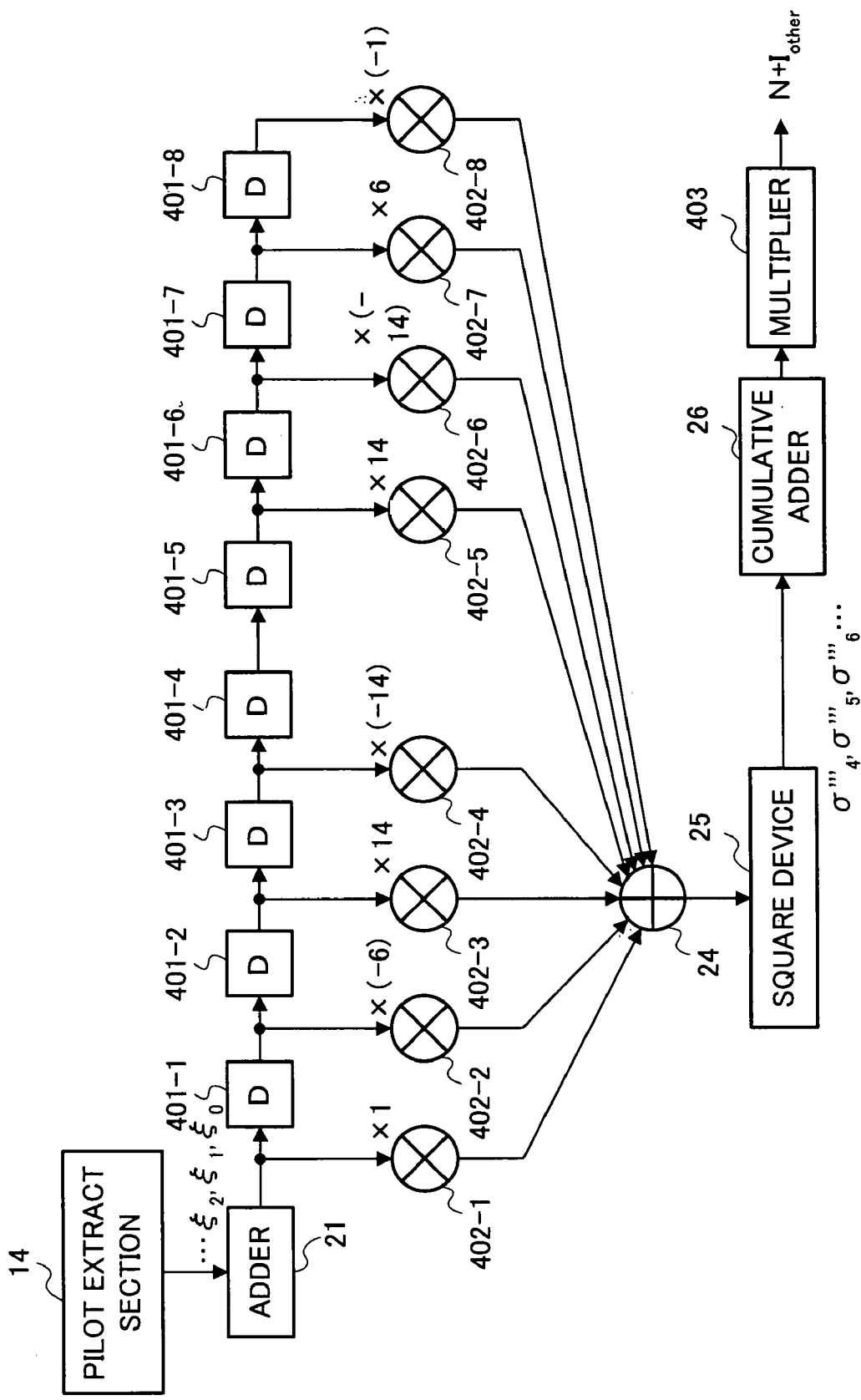
FIG. 8 is a block diagram showing an internal configuration of a noise power estimation section according to the embodiment 3 of the present invention.

FIG. 8 is block diagram showing an internal configuration of a noise power estimation section according to the third embodiment of the present invention. In this figure, same numeral number as in FIG. 5 is assigned to an element that is commonly appeared in FIG. 5, and the detailed explanation thereof is omitted. The point that FIG. 8 is different from FIG. 5, is that the number of the delay devices and the multipliers are respectively increased, and coefficients for multipliers 402-1 to 402-8 and a multiplier 403 are changed.

Arithmetic operations provided by the noise power estimation section shown in FIG. 8 will be described using formula. Here, specific arithmetic operations will be described focusing on a subcarrier i. However, since the operations until formula (16) is derived in this example is the same as in the first embodiment, description will be made for operations after obtaining formula (16).

In the third embodiment, additional correction is further added to formula (16), and thereafter, similarly as each of the embodiments stated above, expansion and approximation are carried out to obtain the following formula (37):

[formula 37]

$$\sigma_i'' = \left(\frac{1}{32}\right)^2\left(\frac{1}{4}\right)^2 \\ |-n_{i-4} + 6n_{i-3} - 14n_{i-2} + 14n_{i-1} - 14n_{i+1} + 14n_{i+2} - 6n_{i+3} + n_{i+4}|^2 \quad (37)$$

Actually, the calculation of this formula (37) is carried out by replacing n with ξ.

[formula 38]

$$\sigma_i''' = \left(\frac{1}{128}\right)^2 \\ |-\xi_{i-4} + 6\xi_{i-3} - 14\xi_{i-2} + 14\xi_{i-1} - 14\xi_{i+1} + 14\xi_{i+2} - 6\xi_{i+3} + \xi_{i+4}|^2 \quad (38)$$

Coefficients set for multipliers 402-1 to 402-8 are same as coefficients of respective ξ presented by formula (38), and values of the coefficients reflect the corrections conducted for three times. Further, adding operation for ξ is conducted by the adder 24, and the added value is squared in a square device 25. Here, provided that $n_{i-4}$ to $n_{i+4}$ satisfy probability distribution of Gaussian distribution in formula (37) and average power is presented as $(na)^2$ it can be expressed by formula (39):

[formula 39]

$$\sigma_i''' = \left(\frac{1}{128}\right)^2 \cdot 858 n_a^2 \quad (39)$$

Here, assuming that $\alpha=(1/128)^2(858)$, noise power ("N+$I_{other}$") is presented as:

[formula 40]

$$N + I_{other} = \frac{4}{\alpha} \cdot (\sigma_4'' + \sigma_5'' + \sigma_6'' \cdots + \sigma_{N_c-5}'')/N_c - 8 \quad (40)$$

As such, according to the present embodiment, the estimation accuracy of the noise power can further be achieved, by adding corrections conducted for three times during the process for estimating noise power.

Fourth Embodiment

While the third embodiment illustrates a case of conducting the correcting operations for three times during the process for estimating noise power, in the configuration of using ξ that are obtained by averaging ξ of adjacent two subcarriers when noise power of subcarrier is calculated, the fourth embodiment will illustrate a case of conducting the correcting operations for three times during the process for estimating noise power in the case of using ξ that are obtained by averaging ξ of adjacent four subcarriers.

Figure 9:
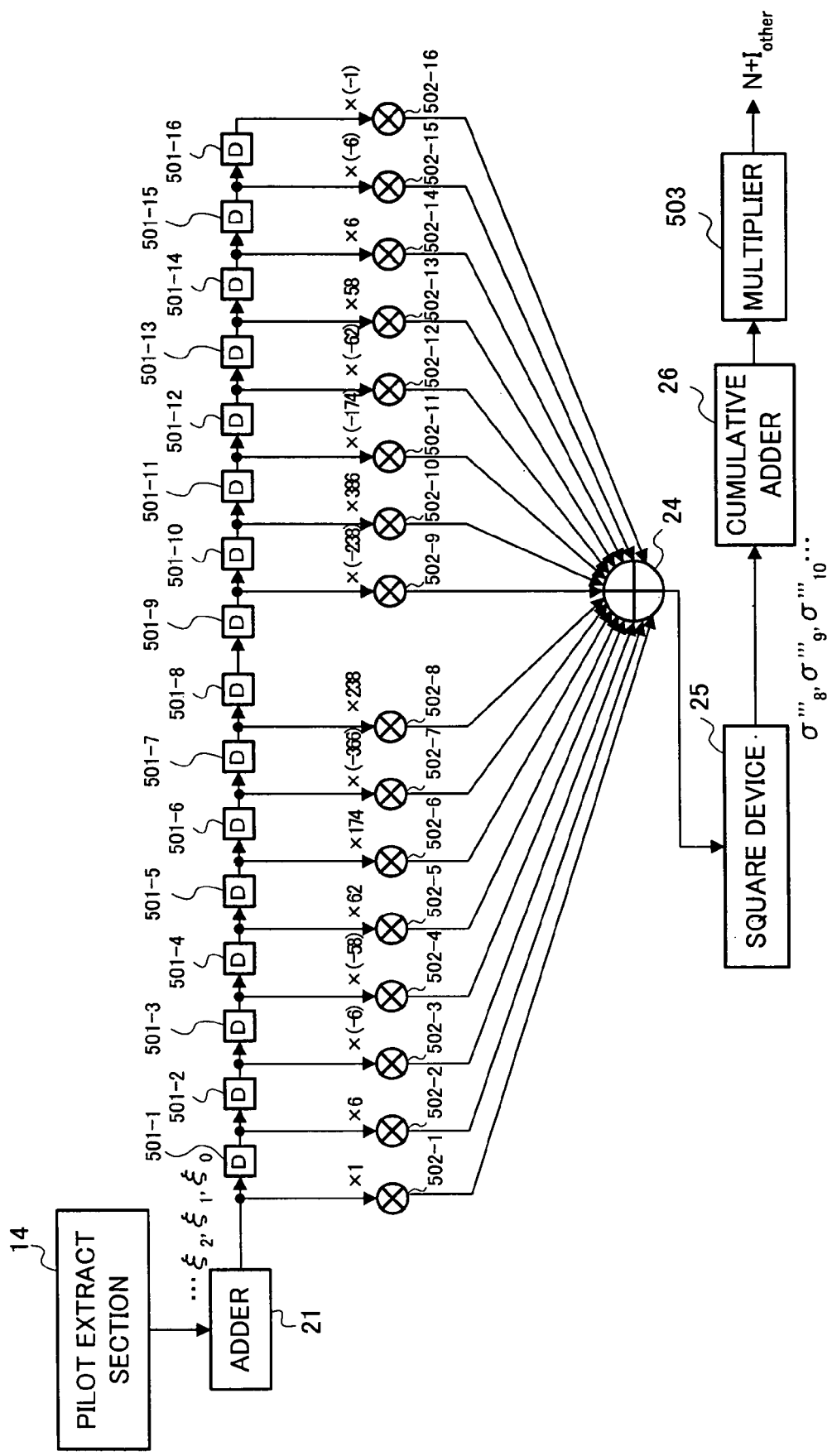
FIG. 9 is a block diagram showing an internal configuration of a noise power estimation section according to the embodiment 4 of the present invention.

FIG. 9 is block diagram showing an internal configuration of a noise power estimation section according to the fourth embodiment of the present invention. In this figure, same numeral number as in FIG. 5 is assigned to an element that is commonly appeared in FIG. 5, and the detailed explanation thereof is omitted. The point that FIG. 9 is different from FIG. 5, is that the number of the delay devices and the multipliers are respectively increased, and coefficients for multipliers 502-1 to 502-16 and a multiplier 503 are changed.

Arithmetic operations provided by the noise power estimation section shown in FIG. 9 will be described using formula.

Here, specific arithmetic operations will be described focusing on a subcarrier i. However, since the operations until formula (31) is derived in this example is the same as in the second embodiment, description will be made for operations after obtaining formula (31). In the fourth embodiment, additional correction is further added to formula (31), and thereafter, similarly as each of the embodiments stated above, expansion and approximation are carried out to obtain the following formula (41):

[formula 41] (41)

$$\sigma_i^m = \left(\frac{1}{256}\right)^2 \left(\frac{1}{8}\right)^2 |-n_{i-8} - 6n_{i-7} + 6n_{i-6} + 58n_{i-5} - 62n_{i-4} - 174n_{i-3} + 366n_{i-2} - 238n_{i-1} + 238n_{i+1} - 366n_{i+2} + 174n_{i+3} + 62n_{i+4} - 58n_{i+5} - 6n_{i+6} + 6n_{i+7} + n_{i+8}|^2$$

Actually, the calculation of this formula (41) is carried out by replacing n with ξ.

[formula 42] (42)

$$\sigma_i^m = \left(\frac{1}{2048}\right)^2 |-\xi_{i-8} - 6\xi_{i-7} + 6\xi_{i-6} + 58\xi_{i-5} - 62\xi_{i-4} - 174\xi_{i-3} + 366\xi_{i-2} - 238\xi_{i-1} + 238\xi_{i+1} - 366\xi_{i+2} + 174\xi_{i+3} + 62\xi_{i+4} - 58\xi_{i+5} - 6\xi_{i+6} + 6\xi_{i+7} + \xi_{i+8}|^2$$

Coefficients set for multipliers 502-1 to 502-16 are same as coefficients of respective ξ presented by formula (42), and values of the coefficients reflect the corrections conducted for three times. Further, adding operation for ξ is conducted by the adder 24, and the added value is squared in a square device 25.

Here, provided that $n_{i-8}$ to $n_{i+8}$ satisfy probability distribution of Gaussian distribution in formula (41) and average power is presented as $(na)^2$, it can be expressed by formula (43):

[formula 43] (43)

$$\sigma_i^m = \left(\frac{1}{2048}\right)^2 \cdot 456314 n_a^2$$

Here, assuming that $\alpha = (1/2048)^2 (456314)$, noise power ("$N+I_{other}$") is presented as:

[formula 44] (44)

$$N + I_{other} = \frac{4}{\alpha} \cdot (\sigma''_8 + \sigma''_9 + \sigma''_{10} \ldots + \sigma''_{N_c-9})/N_c - 16$$

As such, according to the present embodiment, the estimation accuracy of the noise power can further be achieved, by conducting corrections for three times during the process for estimating noise, in the case of using ξ that are obtained by averaging ξ of adjacent four subcarriers when noise power of subcarrier is calculated.

Fifth Embodiment

While the second embodiment illustrates a case of adjusting number of subcarrier employed in the averaging operation, or in other words, a case of adjusting number of pilots arranged along the frequency orientation, based on the measurement result of a delay spread, which is measured by estimating the condition of frequency selective fading, the fifth embodiment of the present invention will illustrate a case of adjusting number of pilots arranged along the time orientation employed in the averaging operation.

Figure 10:
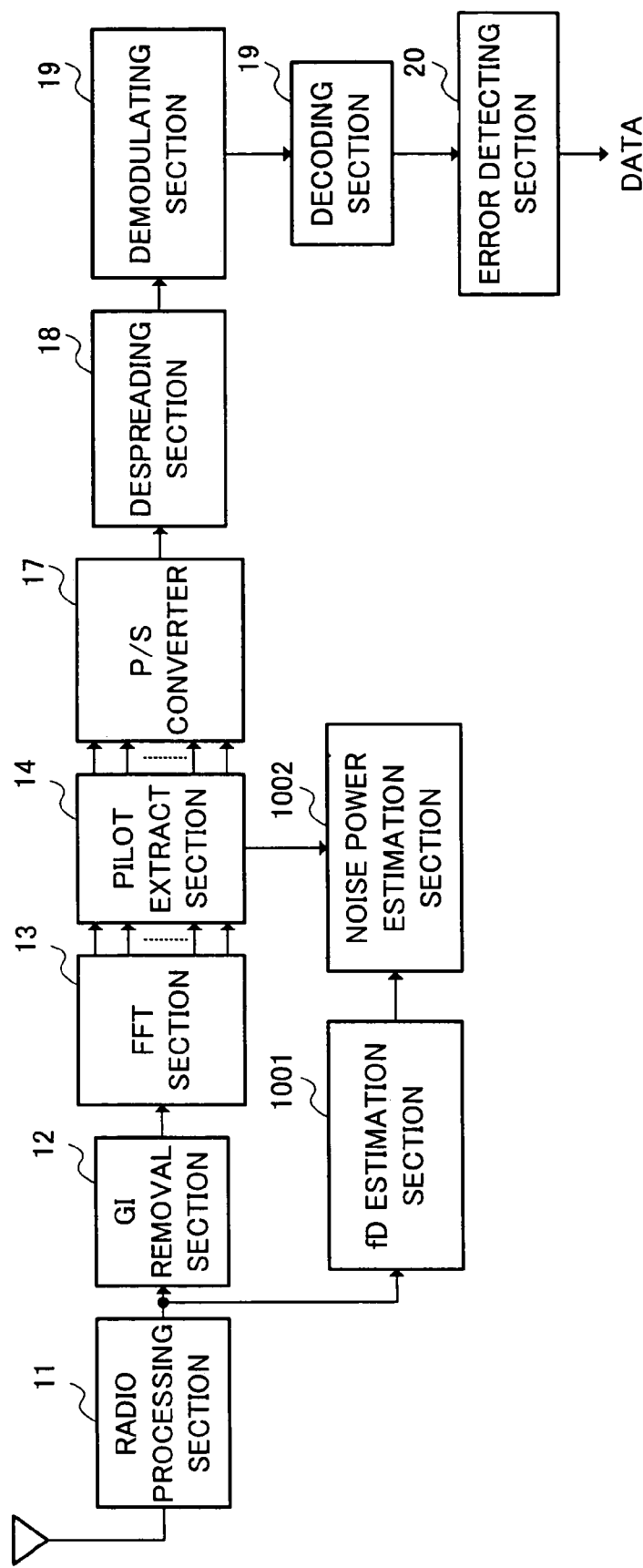
FIG. 10 is a block diagram showing configuration of receiving system according to the embodiment 5 of the present invention.

FIG. 10 is a block diagram showing a configuration of a receiving system according to the fifth embodiment of the present invention. However, same numeral number as in FIG. 6 is assigned to an element that is commonly appeared in FIG. 10 and FIG. 6, and the detailed explanation thereof is omitted. The point that FIG. 10 is different from FIG. 6, is that the delay spread determination section 201 is replaced with a fD estimation section 1001 and that the noise power estimation section 202 is replaced with a noise power estimation section 1002.

The fD estimation section 1001 estimates Doppler frequency based on signal (received signal) that is output from a radio processing section 11, and the estimated Doppler frequency is output to the noise power estimation section 1002.

The noise power estimation section 1002 changes number of PICH arranged along the time orientation employed for the in-phase adding operation, on the basis of the estimated results obtained by the fD estimation section 1001. More specifically, since the drift of fading is gradual when Doppler frequency is lower, and thus the accuracy for estimating noise power can be improved by increasing number of PICH arranged along the time orientation employed in the in-phase adding operation. On the contrary, since the drift of fading is intense when Doppler frequency is higher, an increase of the error generated by the difference in channel variation can be prevented by decreasing number of PICH arranged along the time orientation employed in the in-phase adding operation.

According to the present embodiment, number of PICH arranged along the time orientation employed in the in-phase adding operation is changed based on Doppler frequency, so that the influence to the fading is reduced, and the accuracy for estimating noise power is further improved.

As have been described above, according to the present invention, the accuracy for estimating the noise power can be improved by repeatedly correcting for multiple times the differences in the channel variations in the different subcarriers when noise power is estimated, even if the correlation between adjacent subcarriers is low due to the frequency selective fading.

Although each of the above preferred embodiments describes that corrected values of noise power per one subcarrier, which are obtained for the whole subcarrier wave, are cumulative-added, and the obtained values are averaged to estimate noise power, the present invention is not limited thereto, and corrected values of noise power per one subcarrier, which are obtained for a desired subcarrier, may also be cumulative-added, and the obtained values may be averaged by using the desired subcarrier.

In addition, the multiplex system for pilot signal (PICH) described in each of the embodiments stated above may be any multiplex system, such as time multiplex, frequency multiplex, scattered multiplex, code multiplex and the like. In addition, the method for estimating noise power and the noise power estimation apparatus of the present invention may be applied to Multiple Input Multiple Output—Orthogonal Frequency Division Multiplexing (MIMO-OFDM) or transmission diversity. It is considered that, in the MIMO-OFDM or the transmission diversity, there are basically a lot of scatters, and the propagation paths for each of the antenna are influenced by highly-selective fading, and thus received power considerably fluctuates between subcarriers.

Thus, the estimation accuracy of noise power can be improved by applying method for estimating noise power and the noise power estimation apparatus of the present invention.

The present application is based on Japanese patent application No. 2003-038935, filed Feb. 17, 2003, the whole contents of which are hereby incorporated by reference.

INDUSTRIAL APPLICABILITY

The present invention is preferable to be applied to a radio receiver.

The invention claimed is:

1. A method for estimating noise power, comprising:
   averaging correlated values of a pilot signal arranged in a plurality of subcarrier waves;
   calculating noise power per one subcarrier wave using the averaged values of the correlated values of said pilot signal;
   correcting calculation error of said noise power generated by difference of channel variation between subcarrier waves for multiple times based on said pilot signal;
   cumulative-adding values of noise power per one subcarrier wave, which are corrected in desired subcarrier wave band; and
   averaging thereof by multiplying a predetermined value to the value obtained by the cumulative-adding operation to estimate noise power.

2. The method for estimating noise power according to claim 1, further comprising:
   correcting calculation error of said noise power per one subcarrier wave generated by difference of channel variation between subcarrier waves, using an average value of the correlated value of said pilot signal in the subcarrier wave in question; and
   further repeatedly correcting an error generated by said correction.

3. The method for estimating noise power according to claim 1, wherein number of a plurality of employed adjacent subcarrier waves is variable when the averaging operation for the correlated values of said pilot signal in a plurality of adjacent subcarrier waves is conducted.

4. The method for estimating noise power according to claim 3, further comprising:
   measuring a level of spreading of multipath based on a received signal;
   determining a level of correlation between adjacent subcarrier waves by the level of the measured spreading of the multipath,
   wherein number of said employed plurality of adjacent subcarrier waves is increased when the correlation between adjacent subcarrier waves is high, and
   wherein number of said employed plurality of adjacent subcarrier waves is decreased when the correlation between adjacent subcarrier waves is low.

5. The method for estimating noise power according to claim 1, further comprising:
   estimating Doppler frequency based on a received signal,
   wherein number of employed pilot signal arranged along the time orientation is increased when estimated Doppler frequency is low,
   wherein number of employed pilot signal arranged along the time orientation is decreased when estimated Doppler frequency is high, and
   wherein value obtained by in-phase adding the correlated values of a plurality of pilot signals in each of subcarrier waves is employed as the correlated value of said pilot signal.

6. A noise power estimation apparatus, comprising:
   a pilot signal-extracting means for extracting pilot signal from signal transmitted by using a plurality of subcarrier waves from a communication partner;
   a first multiplying means for multiplying respective predetermined coefficients to correlated values of said pilot signal between a plurality of adjacent subcarrier waves;
   a square means for calculating noise power per one subcarrier wave by squaring after adding said multiplying result;
   a cumulative-adding means for cumulative-adding noise power per one subcarrier wave calculated by said square means for desired subcarrier waves; and
   a second multiplying means for multiplying a predetermined value to the cumulative-added value calculated by said cumulative-adding means to obtain an averaging value,
   wherein said first multiplying means has the predetermined coefficient reflecting a result, which is obtained by correcting for multiple times a calculation error of noise power per one subcarrier wave generated by a difference in a channel variation between subcarrier waves based on said pilot signal.

* * * * *

UNITED STATES PATENT AND TRADEMARK OFFICE
CERTIFICATE OF CORRECTION

PATENT NO. : 7,532,864 B2  
APPLICATION NO. : 10/524213  
DATED : May 12, 2009  
INVENTOR(S) : Masaru Fukuoka et al.

It is certified that error appears in the above-identified patent and that said Letters Patent is hereby corrected as shown below:

On the title page: Item (73): Assignee, currently reads:

(73) Assignee: Panasonic Corporation, Osaka (JP)

and should read:

(73) Assignee: PANASONIC MOBILE COMMUNICATIONS CO., LTD., Yokohama (JP); and

NTT DOCOMO, INC., Tokyo (JP)

Signed and Sealed this

Eighth Day of June, 2010

David J. Kappos  
*Director of the United States Patent and Trademark Office*